United States Patent Office 2,895,986
Patented July 21, 1959

---

2,895,986

PREPARATION OF META-SULFOISOPHTHALIC ACID

Harold W. Burns, Wenonah, N.J., assignor to E. I. du Pont de Nemours and Company, Wilmington, Del., a corporation of Delaware No Drawing. Application October 21, 1957
Serial No. 691,167

2 Claims. (Cl. 260—507)

The present invention relates to a process for the sulfonation of isophthalic acid. More particularly, the present invention relates to a process for the preparation of m-sulfoisophthalic acid.

The prior art discloses numerous agents for sulfonating organic compounds. On page 262 of Groggins, "Unit Process of Organic Synthesis," McGraw-Hill Book Company, Inc. N.Y., N.Y. (1947), there is listed a number of sulfonating agents which have been successfully employed in this capacity including, for example, sulfuric acid, oleum, sulfur trioxide, acid sulfates, acid sulfites, hyposulfites, etc. One of the simplest and most economical of these known sulfonating agents is sulfur trioxide. However, due to the relatively low boiling point of this compound (44.6° C.), it is generally necessary to work with $SO_3$ either in the gaseous form or else in an organic solvent solution.

This presents obvious procedural difficulties if the organic substance to be sulfonated is a solid. In order to fluidize the reaction mass when sulfur trioxide is heated with a solid organic chemical, it is usually necessary to include an organic solvent or diluent in order that good contact between the reactants may be obtained. This not only increases the cost of the sulfonation by the price of the solvent or diluent, but adds additional manipulative steps to the process by requiring subsequent separation and/or work-up of the product.

In some instances, it is possible to pass gaseous $SO_3$ through the organic chemical in the molten state. For obvious reasons, however, this is not feasible with high-melting solids. Isophthalic acid melts at about 347° C.

It is an object of the present invention to sulfonate solid isophthalic acid with sulfur trioxide. It is a further object of the present invention to sulfonate solid isophthalic acid with sulfur trioxide in the liquid state without the use of additional solvents or diluents. Other and additional objects will become apparent from a consideration of the ensuing specification and claims.

Since the reaction of isophthalic acid and sulfur trioxide is essentially endothermic in nature, it is necessary to employ elevated temperatures in order to obtain the m-sulfoisophthalic acid. However, since sulfur trioxide boils at 44.6° C., elevated temperatures would be expected to vaporize the sulfur trioxide unless costly pressure equipment is utilized to pressurize the reaction mass and retain the sulfur trioxide in the liquid state. According to the present invention it has been found that, contrary to expectations, solid isophthalic acid may be reacted at atmospheric pressure conditions with liquid sulfur trioxide. The sulfur trioxide does not vaporize to any substantial extent at the elevated temperatures required, viz, about 200° C., but rather remains in the liquid state throughout the reaction. The invention is further illustrated by the following specific examples:

*Example 1*

83 g. (0.5 mole) of isophthalic acid was added to a round 500-ml. 3-necked flask equipped with a sealed stirrer, a dropping funnel, a water-jacketed condenser, and a bottom discharge port. The openings at the top of the condenser and dropping funnel contained drying tubes filled with calcium chloride to prevent the entrance of moisture, with which $SO_3$ reacts to give white fumes. From the dropping funnel, 60 g. (0.75 mole, 50% excess) of stabilized liquid sulfur trioxide was added to the isophthalic acid over a period of about 10 min. The isophthalic acid being moistened with $SO_3$ turned brown and the reaction mass became sticky and difficult to stir. After all the $SO_3$ had been added, the dropping funnel was removed, and a thermometer was inserted so as to measure the temperature of the sulfonator charge. The flask was heated by an electric heating mantle without stirring the reaction mixture. When the temperature reached about 150° C., the mass became fluid enough so that the agitator could be started. The temperature was raised within 15 min. to 205° C., the mixture was maintained at 205°–210° C. for 1.25 hr. The mixture did not boil, and there was no refluxing of $SO_3$. Once fluidized, the reaction mass remained liquid throughout. At this time, addition of a small sample of the molten mixture to water produced a clear, aqueous solution, indicating that sulfonation was complete since isophthalic acid is essentially insoluble in water.

*Example 2*

To 83 g. (0.5 mole) of isophthalic acid in the equipment described in Example 1 was added 44 g. (0.55 mole, 10% excess) of $SO_3$ as before. The temperature was raised to 260° C. and maintained there for 20 min., at which point the sufonation was complete, as measured by the water solubility test. Once fluidized, the reaction mass remained liquid throughout and no $SO_3$ reflux was observed.

*Example 3*

To 83 g. (0.5 mole) of isophthalic acid in the equipment described in Example 1 was added 80 g. (1.0 mole, 100% excess) of $SO_3$ as before. The temperature was raised to 205° C. and held there for 2 hr., at which time the sulfonation was complete. Once fluidized, the reaction mass remained fluid throughout and no reflux of $SO_3$ was observed.

*Example 4*

To 83 g. (0.5 mole) of isophthalic acid in the equipment described in Example 1 was added 50 g. (0.625 mole, 25% excess) of $SO_3$ as before. The temperature was raised to 205° C. and held there. Once fluidized, the reaction mass remained liquid throughout and no $SO_3$ reflux was observed. A sample of the molten mixture taken after one hour at 205° C. indicated that sulfonation was then 91% complete. A sample taken after 2 hr. indicated 98% sulfonation. The 3-hr. sample indicated 100% sulfonation of the isophthalic acid.

*Example 5*

It is also possible to practice the process of the present invention on a continuous basis. For continuous sulfonation, a 2-stage reactor consisting of an electrically-heated, stirred 500-ml. round flask whose partially sulfonated contents overflowed into a similar flask was used. Isophthalic acid and $SO_3$ were fed continuously into the first flask at the rate of 166 g./hr. and 120 g./hr., respectively (50% excess $SO_3$). The contents of each flask was held at about 205° C. The liquid mixtures in both flasks were maintained by the adjustment of seal legs at levels such that the holdup time for each stage was 1.25 hr. The effluent from the second sulfonator was completely sulfonated. Once fluidized, the reaction mass remained liquid throughout. No substantial reflux of $SO_3$ in either flask was observed to occur.

Example 6

Isophthalic acid was continuously sulfonated at 205° C. with liquid $SO_3$ in the equipment described in Example 5. Feed rates were 133 g. isophthalic acid per hour and 82 g. $SO_3$ (30% excess $SO_3$) per hour. Holdup times were 1.5 hr. per stage. The product was 99.4% sulfonated. Once fluidized, the reaction mass remained liquid throughout, and no substantial reflux of $SO_3$ was observed.

The process of the present invention is predicated on the surprising discovery that liquid sulfur trioxide and solid isophthalic acid may be mixed and heated at atmospheric pressure without vaporizing the sulfur trioxide, which normally boils at 44.6° C. Even at temperatures as high as 200–260° C. the reaction mass remains liquid with no substantial vapor loss of the sulfur trioxide.

The exact mechanism of the process cannot be explained with certainty. One possible explanation may be that the isophthalic acid and $SO_3$ react to form a sulfuric acid ester of the isophthalic acid which is liquid at the temperature of reaction. I do not, however, wish to be limited to any specific theory or reaction mechanism. Regardless of the explanation for the phenomenon that has been observed, it is true that the above-described process can be performed at atmospheric pressure in the manner disclosed above with no significant vapor loss of the $SO_3$ sulfonating agent not-withstanding the latter's normally low boiling point.

The economic advantages of the process of the present invention for the preparation of m-sulfoisophthalic acid are at once apparent. The liquid sulfur trioxide fluidizes the reaction mass and makes possible an intimate contact between itself and the isophthalic acid. The absence of any extraneous solvent or diluent eliminates the cost of such a third component from the process, and also eliminates the cost of subsequent separation and recovery. No special pressure equipment is required.

The elevated temperatures which are used make possible the achievement of the sulfonated product in high yields. In this connection, temperatures as low as about 160° C. are operative. Inasmuch as the rate of reaction is directly dependent upon the temperature, however, more advanced temperatures are preferable, especially temperatures in the range of about 200–260° C. Temperatures in excess of 260° C. up to the decomposition temperatures of the materials involved are operable but are of no special advantage.

The ratio of $SO_3$ sulfonating agent to isophthalic acid is not generally critical to the invention. One mole of the $SO_3$ will sulfonate the isophthalic acid to produce one mole of the sulfonate. For efficiency purposes, a slight excess of $SO_3$ (10–30%) will normally be used. Larger proportions of $SO_3$ are operable except that excesses greater than about 50–100% serve no particular function, and would be wasteful.

Commercially available sulfur trioxide frequently contains a stabilizer to discourage polymerization of the sulfur trioxide. Sulfur trioxide thus stabilized, is completely satisfactory for use in the present invention. The stabilizer additive is for the purpose of enhancing the storage characteristics of the sulfur trioxide and in no way enters into or affects the use of the sulfur trioxide as a sulfonating agent for the isophthalic acid.

Having thus described the invention, it is intended to be limited only by the following claims.

I claim:

1. A liquid phase process for the preparation of m-sulfoisophthalic acid which comprises forming a liquid reaction mass by mixing solid isophthalic acid with liquid $SO_3$ in the absence of a separate fluidizing agent at atmospheric pressure and at a temperature in excess of 160° C., and retaining said liquid reaction mass at atmospheric pressure and at the elevated temperature until the isophthalic acid has reacted with the liquid $SO_3$ to form the m-sulfoisophthalic acid product.

2. A process as in claim 1 wherein the temperature is within the range of about 200°–260° C.

References Cited in the file of this patent

UNITED STATES PATENTS 2,691,040    Bloch et al. _____ Oct. 5, 1954